May 18, 1965  J. C. F. WHICKER  3,183,733
SCREW AND NUT MECHANISMS
Filed April 2, 1963
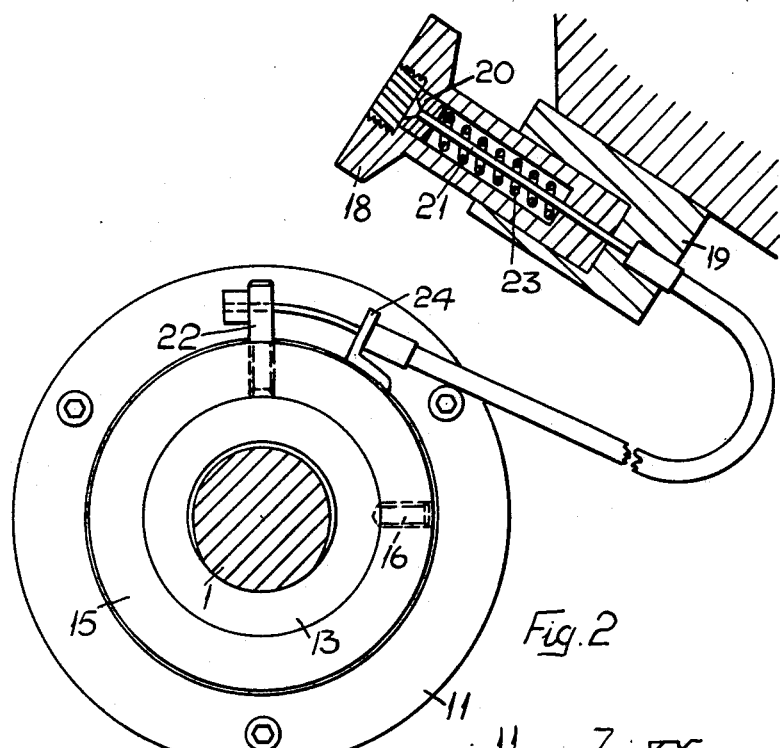
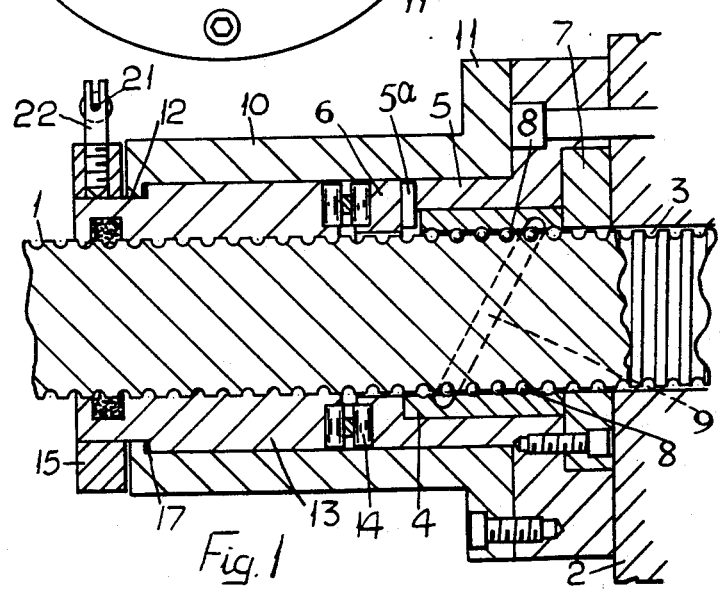
Fig. 2
Fig. 1

United States Patent Office 3,183,733
Patented May 18, 1965

3,183,733
SCREW AND NUT MECHANISMS
John Charles Frederick Whicker, Tring, England, assignor to Rotax Limited, London, England
Filed Apr. 2, 1963, Ser. No. 270,017
Claims priority, application Great Britain, Apr. 5, 1962, 13,205/62
3 Claims. (Cl. 74—424.8)

This invention relates to screw and nut mechanism of the so-called recirculating ball type and comprising a shaft in which is formed a helical groove, a nut having a helical groove in its internal periphery, and a plurality of balls engaging the grooves in the shaft and nut the latter being provided with a passage through which the balls can pass from one end of the groove to the other.

The frictional resistance of such mechanisms is so small that when they are used with lifting apparatus, the load on the nut may be sufficient to cause the shaft to rotate and allow the load to descend.

The object of the invention is to combine with such a mechanism convenient means for preventing or minimising this tendency.

According to the invention in a mechanism of the kind specified there is associated with the nut a member which is permitted limited relative angular movement, and is provided with a helical rib engaging the groove in the shaft, the arrangement being such that during relative rotation of the shaft and nut in one direction the rib will freely engage the groove of the shaft, but relative rotation of the shaft and nut in the opposite direction will cause the rib to bind in the groove of the shaft and thereby apply an increased frictional resistance to relative movement.

In the accompanying drawings:

FIGURE 1 is a sectional side elevation of part of a lifting apparatus incorporating the invention and FIGURE 2 is an end view of the apparatus shown in FIGURE 1 also illustrating an operating device.

Referring to the drawings there is provided a shaft 1 which extends from a body 2 of a lifting device. In the periphery of the shaft is formed a helical groove 3 of substantially semi circular cross-section and surrounding the shaft is a nut 4 which is non-rotatably mounted by means of a pin 5a in a housing 5 secured to the body. The nut is located against axial movement relative to the housing by a shoulder 6 formed on the housing, and by a spacing ring 7 secured to the housing and mounted between the body and the housing. The nut is formed with a helical groove complementary to the groove on the shaft and interposed between the nut and the shaft and located in the grooves, are a plurality of balls 8. The arrangement is such that when the shaft is rotated relative to the housing it will also be moved axially relative thereto. Moreover the balls will be moved axially and a return passage 9 is provided in the nut to allow the balls to circulate as the shaft is rotated. In place of the passage 9 a tube transfer system may be employed in which case the tube may be external of the nut.

Also surrounding the shaft but spaced therefrom is a hollow cylindrical part 10 which has an outwardly extending flange 11 at one end for connection to the housing and an inwardly directed flange 12 formed at the other end. Accommodated within the annular space defined between the part 10 and the shaft 1 is a locknut 13 which has formed on its internal periphery a rib complementary to the groove on the shaft, and interposed between the shoulder 6 and the locknut is a thrust bearing 14. Furthermore the locknut is of reduced diameter at its end remote from the nut and extends beyond the end of the part 10 and surrounding this reduced portion of the locknut is an annular ring 15 which is secured to the locknut by a grub screw 16. The locknut is permitted limited axial movement relative to the part 10 and this is indicated in FIGURE 1 by the clearance 17 between the flange 12 and a shoulder on the locknut defined by the portion of reduced diameter.

As shown in FIGURE 1 the groove on the screw is a left hand thread and the arrangement is such that when the shaft is rotated to raise the load the clearance 17 will be taken up and the shaft will be free to rotate. When, however, the shaft is not rotated the load will tend to drive the shaft in the reverse direction because of the low friction of the ball and nut mechanism and the locknut 13 will be driven against the thrust bearing 14 into locking engagement with the shaft to prevent further movement thereof. In order to permit the shaft to rotate, the locknut must be moved out of locking engagement and for this purpose a release device is provided.

This device comprises a knob 18 which is slidably mounted in a housing 19 mounted in any convenient position. Within a bore in the knob is slidably mounted a nipple 20 secured to one end of the inner member of a Bowden cable 21 the outer member of which is interposed between the housing 19 and a bracket 24 mounted on the part 10. The other end of the inner member is connected to a pin 22 secured to the ring 15, and interposed between the nipple 20 and the remote end of the bore is a coiled compression spring 23 which is provided to give lost motion between movement of the knob and movement of the pin 22. The arrangement is such that when the knob 18 is pulled, and the lost motion has been taken up, the ring 15 will be moved angularly for the purpose described. If desired the lucknut 13 may be actuated by other means such for instance as a solenoid or a fluid operable piston.

Having thus described my invention what I claim as new and desire to secure by Letters Patent is:

1. A screw and nut mechanism comprising in combination, a shaft extending from one end of a housing, a helical groove formed in the periphery of the shaft, a nut mounted on said housing, a groove formed in the internal periphery of the nut, a plurality of balls located in said grooves, passage means through which the balls can return from one end to the other end of the groove in the nut as relative rotation is imparted to the shaft and the nut, and a member mounted within an extension of the housing and having a helical rib formed on its face presented to the shaft for engagement with the groove in the shaft, said member being permitted limited angular movement relative to the nut so that, when relative movement takes place between the shaft and the nut in one direction, the rib will freely engage the groove of the shaft but when such relative movement takes place in the opposite direction angular movement of the member will occur relative to the nut and the rib will be caused to bind in the groove of the shaft.

2. A screw and nut mechanism comprising in combination a shaft extending from one end of a housing, a helical groove formed in the periphery of the shaft, a nut mounted on said housing, a groove formed in the internal periphery of the nut, a plurality of balls located in said grooves, passage means through which the balls can return from one end to the other end of the groove in the nut as relative rotation occurs between the nut and the shaft, a member mounted within an extension of the housing and having a helical rib formed on its face presented to the shaft for engagement with the groove in the shaft, said member being permitted limited angular movement relative to the nut so that when relative angular movement takes place between the shaft and the nut in one direction the rib will freely engage the groove on the shaft, but when such relative movement takes place in the opposite direction, angular movement of the member will occur in one direction relative to the nut and the rib will be caused to bind in the groove of the shaft, and release means operable to move the nut and member angularly in the other direction to move the rib out of binding engagement with the groove of the shaft.

3. A screw and nut mechanism comprising in combination a shaft extending from one end of a housing, a helical groove formed in the periphery of the shaft, a nut mounted on said housing, a groove formed in the internal periphery of the nut, a plurality of balls located in said grooves, passage means through which the balls can return from one end to the other end of the groove in the nut as relative rotation occurs between the nut and the shaft, a member mounted within an extension of the housing and having a helical rib formed on its face presented to the shaft for engagement with the groove in the shaft, said member being permitted limited angular movement relative to the nut so that when relative angular movement takes place between the shaft and the nut in one direction the rib will freely engage the groove on the shaft, but when such relative movement takes place in the opposite direction, angular movement of the member will occur in one direction relative to the nut, and the rib will be caused to bind in the groove of the shaft, release means operable to move the nut and member in the other direction to move the rib out of binding engagement with the groove of the shaft and an anti-friction bearing mounted between the member and a face against which the member bears when the rib is in binding engagement with the groove.

References Cited by the Examiner
UNITED STATES PATENTS

| | | | |
|---|---|---|---|
| 2,447,439 | 8/48 | Thompson | 74—424.8 |
| 2,623,403 | 12/52 | Terdina | 74—424.8 |

DON A. WAITE, *Primary Examiner.*